United States Patent [19]

Suzuki

[11] 4,252,284
[45] Feb. 24, 1981

[54] DRIVE REVERSING MECHANISM

[75] Inventor: Kanzi Suzuki, Shizuoka, Japan

[73] Assignee: Star Seimitsu Kabushiki Kaisha, Shizuoka, Japan

[21] Appl. No.: 969,680

[22] Filed: Dec. 15, 1978

[51] Int. Cl.³ .......................... G03B 1/04; G11B 15/32
[52] U.S. Cl. ..................................... 242/201; 242/204
[58] Field of Search ....................... 242/201, 67.4, 204, 242/216, 202

[56] References Cited

U.S. PATENT DOCUMENTS

| | | | |
|---|---|---|---|
| 2,275,498 | 10/1942 | Berndt | 242/201 |
| 2,620,404 | 12/1952 | Pond | 242/201 X |
| 3,009,663 | 11/1961 | Armstead | 242/201 |
| 3,900,174 | 8/1975 | Morimoto et al. | 242/201 |
| 3,968,942 | 7/1976 | Wrobel | 242/204 |
| 4,036,458 | 7/1977 | Matthey et al. | 242/201 |

FOREIGN PATENT DOCUMENTS 2440824  3/1976  Fed. Rep. of Germany ........... 242/201

*Primary Examiner*—Leonard D. Christian
*Attorney, Agent, or Firm*—Robert E. Burns; Emmanuel J. Lobato; Bruce L. Adams

[57] ABSTRACT

A reversing mechanism for running a tape or ribbon in one direction or the other between a pair of spools. Each spool has a driven member, and an idler is disposed intermediate the driven members for selective engagement therewith. The idler is driven by a rotatable member which is coupled with a reversible electric motor. A support lever is rotatably mounted on the axis of the rotatable member, and an idle arm is pivotally mounted on one end of the support lever. The idler is rotatably mounted on the idle arm, and is maintained in pressure contact with the rotatable member by a spring extending between the free end of the idle arm and the support lever. As a consequence, the magnitude of torque required to rotate the idler is greater than the magnitude of torque required to rotate the support lever in its free condition. As the motor is reversed, the support lever moves from a first operative position in which the idler engages one of the driven members to a second operative position in which the idler engages the other driven member. Thus, the other driven member is driven in a direction different from the direction in which the one driven member is driven. In a modification, a pair of idlers are provided, each engageable with only associated one of the driven members. These idlers are rotatably mounted on one of idle arms, which are similar to that described above, and are maintained in pressure engagement with the rotatable member.

3 Claims, 4 Drawing Figures

DRIVE REVERSING MECHANISM

FIELD OF THE INVENTION

The invention relates to a reversing mechanism, and more particularly, to an automatic reversing mechanism which may be used to effect a switching between a tape rewind and a rapid advance operation in a magnetic tape recording and reproduction apparatus (hereafter referred to as "tape recorder") or a switching between a forward and a reverse ribbon feed in a dot matrix teleprinter.

An arrangement including a pair of spools which can be alternately driven in opposite directions finds an extensive application, and is well known particularly in the art of tape recorders. A typical arrangement comprises a movable idler disposed intermediate the pair of spools for selective and operative connection therewith. As the idler is moved out of engagement with one of the spools and into engagement with the other, the direction of rotation is reversed. Normally the switching takes place by reversing an electric drive motor. Another arrangement is also known in which first and second idlers are provided (See U.S. Pat. No. 3,554,465, for example.). The first idler is movable between three positions including a first operative position in which it is operatively connected with a drive source, a second operative position in which it is operatively connected with the source and also with one of the spools, and a third inoperative position where it is disconnected from both the source and the one spool. On the other hand, the second idler is selectively movable between its operative position in which it is operatively connected with the first idler in the first operative position thereof and also with the other spool, and its inoperative position where it is disconnected from both the first idler and the other spool. Consequently, in the second operative position of the first idler, said one spool operates as a take-up (rapid advance) spool while in the first operative position of the first idler in combination with the operative position of the second idler, the other spool operates as a take-up (rewind) spool. In the disclosed apparatus, the drive source comprises an irreversible motor.

In either arrangement described above, each idler is mechanically coupled with a pushbutton on operating lever for manual operation.

DESCRIPTION OF THE PRIOR ART

U.S. Pat. No. 3,954,167 discloses the application of an automatic reversing mechanism which does not require a manual operation to a dot matrix teleprinter. A high speed printer of this kind employs a forward and a reverse feed of a ribbon in a similar manner as the rapid advance and rewind of a tape in a tape recorder. The automatic reversing mechanism includes a gear train located between a pair of spools and including a drive gear which is selectively engageable with a driven gear associated with each spool. The gear train also includes an intermediate gear meshing with a pinion gear which is mounted on the shaft of a reversible stepping motor. The intermediate gear is coaxially and integrally formed with the drive gear. A support lever is pivotally mounted on the axis of the step motor, and its one end rotatably carries the drive gear and the intermediate gear. With this reversing mechanism, as the motor is reversed, the intermediate gear moves over the teeth of the pinion gear so that the drive gear is moved out of engagement with one of the driven gears and into engagement with the other. Thus the intermediate gear moves along a track defined by the teeth of the pinion gear until the drive gear moves into meshing engagement with a selected driven gear. This achieves a switching of the direction of rotation of the spools without requiring a manual operation.

For effective switching or shifting of the drive gear as the motor is reversed, the reversing mechanism requires the provision of a friction device which prevents a free wheeling of the gear train including the drive gear. The device comprises a brake plate fitted on the common shaft of the gear train, a washer spring and a lock nut. The brake plate is sufficiently clamped by the lock nut to provide an axial sliding friction with the gear train. However, the abrasion of the brake plate which results from the sliding friction not only reduces the useful life thereof, but also presents a variety of difficulties which are caused by a varying load as a result of changes in the frictional force. Specifically, when this reversing mechanism is applied to a tape recorder, the described change causes wow or flutter. While the above description has dealt with a switching between the rapid advance and the rewind mode of a tape recorder, it is to be noted that a record or playback mode can be established when the mechanism is in its rapid advance mode by reducing the motor speed.

SUMMARY OF THE INVENTION

It is a general object of the invention to provide an automatic reversing mechanism which eliminates the afore described disadvantages of the prior art.

It is a specific object of the invention to provide a tape recorder which includes an electrically controllable tape reversing mechanism for improved maneuverability.

In a reversing mechanism including a support lever which is rotatably mounted on the axis of a rotatable member, connected with a reversible electric motor, in a manner independent from the member and carrying an idler which engages the rotatable member, and wherein the idler is selectively engageable with either one of a pair of driven members in accordance with the movement of the support lever as the motor is reversed, the invention provides means for resiliently urging the idler against the rotatable member so that the idler is in pressure contact with the latter, thereby increasing the magnitude of torque required to rotate the idler beyond the magnitude of torque required to rotate the support lever in its free condition; namely, during its movement from its first operative position where it drives one of the driven members to its second operative position where it drives the other or vice versa. In this manner, the invention achieves an effective switching of the idler as the motor is reversed without requiring a friction device of the sliding type.

In a preferred embodiment of the invention, an idler arm is pivotally mounted on one end of the support lever and rotatably mounts the idler. A spring extends between the free end of the arm and the support lever to urge the idler against the rotatable member.

In a modification, a pair of idlers are mounted on the support lever in the same manner as described, and each is capable of engaging with an associated one of the driven members. They operate in a complementary fashion such that while one idler engages one driven member, the other idler is disengaged from the other driven member.

DESCRIPTION OF PREFERRED EMBODIMENTS

Figure 1:
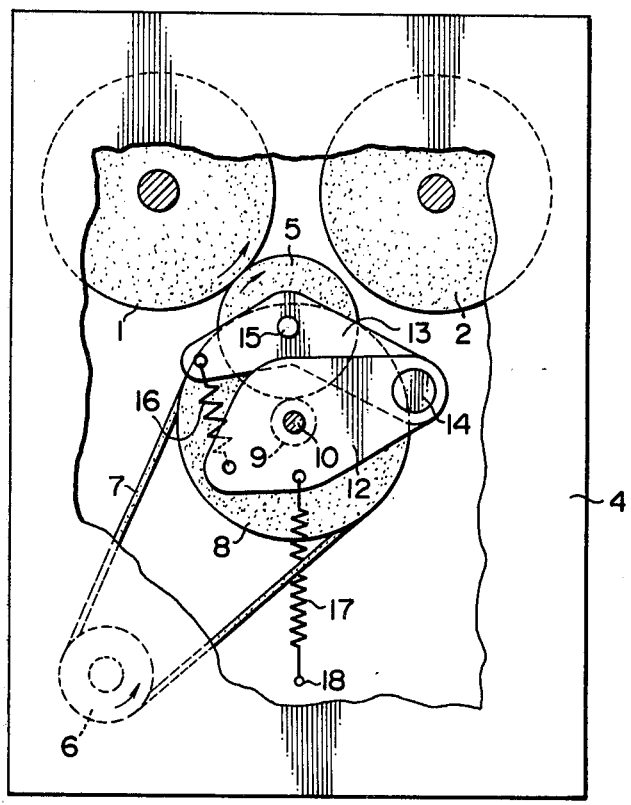
FIG. 1 is a top view, partly cut away, of the reversing mechanism of the invention.
Figure 2:
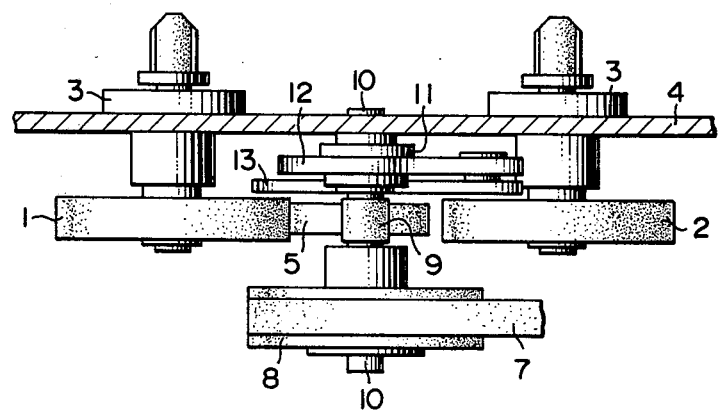
FIG. 2 is a side elevation of the mechanism shown in FIG. 1, but the pair of driven members and associated parts are shown displaced for convenience of illustration and the springs are omitted from illustration.

Referring to FIGS. 1 and 2 initially, there are shown a pair of driven wheels 1, 2, which are rotatably mounted on baseplate 4 by means of bearings 3. To drive individual driven wheels 1, 2 selectively, an idler 5 is disposed therebetween. The idler 5 is driven by a drive wheel 9 that is mounted coaxially with a pulley 8 which is in turn connected with a reversible electric motor 6 through a belt 7. Drive wheel 9 and pulley 8 may be molded integrally from plastic material, and are rotatably mounted on a shaft 10 which is secured to the baseplate 4. Also rotatably mounted on the shaft 10 by means of a bearing 11 is a support lever 12, one end of which fixedly carries a stud 14 on which an idle arm 13 is rotatably mounted. The arm 13 fixedly carries a shaft 15 on which the idler 5 is rotatably mounted. A spring 16 extends between the free end of the idle arm 13 and the support lever 12 to urge the idler 5 resiliently against the drive wheel 9. As a consequence, the idler 5 is maintained in pressure contact with the drive wheel 9 such that the magnitude of torque required to rotate the idler is greater than the magnitude of torque required to rotate the support lever 12 in its free condition. As used throughout the specification and claims, the "free condition" of the support lever 12 refers to the condition when the direction of rotation of the reversible electric motor 6 is reversed to cause turning movement of the support lever about the shaft 10 to bring the idler 5 into engagement with the other of the two driven wheels 1 or 2, i.e., when the support lever is free of the influence of the driven wheels and is able to turn on the shaft 10.

Drive wheel 9 is situated on a first imaginary plane which intersects at right angles with a second imaginary plane which includes the axes of the driven wheels 1, 2. Idler 5 is situated between the second plane and a third imaginary plane which includes the axis of the drive wheel 9 and which is parallel to the second plane. When the support lever 12 is operated, the idler 5 is movable about the axis of the drive wheel 9 between its first operative position in which it engages one of the driven wheels and its second operative position in which it engages the other driven wheel. It will be noted that the first and second operative positions of the idler 5 are located on the opposite sides of the first imaginary plane. To limit the movement of the idler 5 to this extent, it has a diameter which is greater than the spacing between the respective driven wheels and the drive wheel 9.

A spring 17 extends between the support lever 12 and a post 18 fixedly mounted on the baseplate 4 for urging the support lever 12 to its neutral position where the idler 5 engages neither wheel 1 nor 2 when the motor 6 is at rest. When determining the magnitude of torque required to rotate the support lever 12, the influence of the return spring 17 should be taken into account. However, the magnitude of torque required to rotate the idler 5 can be easily established at a higher level than that to rotate the support lever 12 in its free condition, by an adjustment of the spring 16 interposed between the idle arm 13 and the support lever 12.

With this reversing mechanism, when the direction of rotation of the motor 6 is reversed, the drive wheel 9 which is connected therewith tends to rotate the idler 5, but the greater magnitude of torque required to rotate it as compared with that required to rotate the support lever 12 in its free condition causes the latter to rotate such that the idler 5 moves away from its first operative position where it engages one of the driven wheels and to its second operative position where it engages the other driven wheel. As the support lever 12 is moved in this manner, the friction between the idler and the driven wheel is applied as a load on the support lever 12, so that the magnitude of torque required to rotate the idler is reduced, permitting the latter to impart rotation to the other driven wheel in the opposite direction from the direction of rotation previously imparted to the one driven wheel. As the idler 5 shifts from one of the driven wheels to the other, there occurs no free wheeling of the idler nor sliding friction between the idler 5 and the drive wheel 9.

Figure 3:
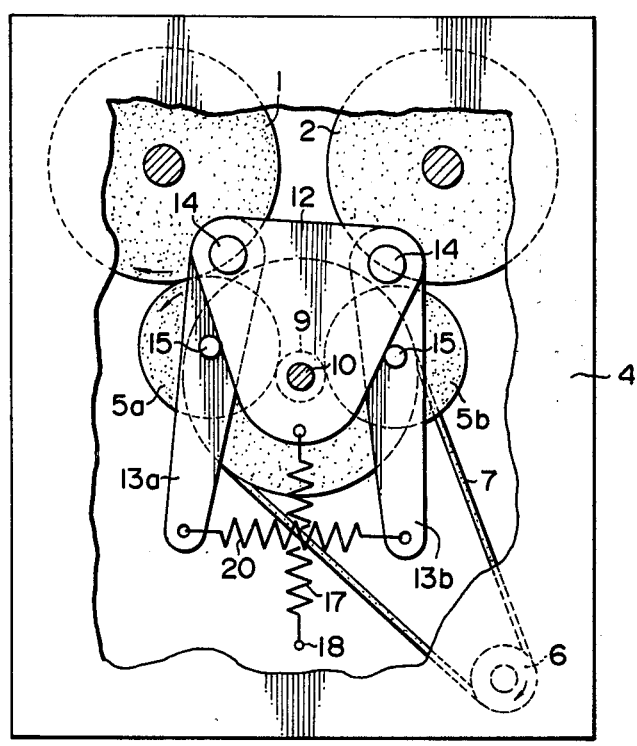
FIG. 3 is a top view, partly cut away, of a modified reversing mechanism.
Figure 4:
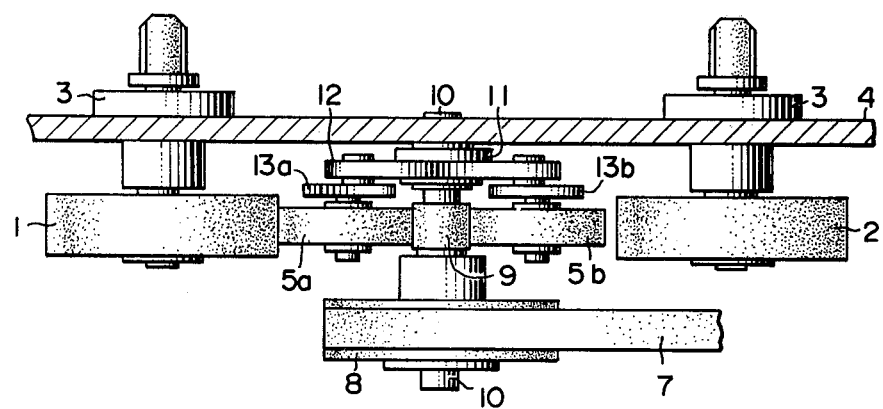
FIG. 4 is a side elevation of the mechanism shown in FIG. 3 in a similar manner as FIG. 2.

FIGS. 3 and 4 show a modified form of the reversing mechanism. It is to be noted that parts corresponding to those illustrated in FIGS. 1 and 2 are designated by like reference numerals in FIGS. 3 and 4. The modified reversing mechanism includes a pair of idlers 5a, 5b each capable of engaging with only an associated one of the pair of driven wheels 1, 2. A pair of idle arms 13a, 13b are rotatably mounted on studs 14 which are secured to the support lever 12, and each idler is rotatably mounted on associated stud 14 by means of bearing 15. The pair of idlers 5a, 5b are situated intermediate the second and third imaginary planes and on the opposite sides of the first imaginary plane. Each idler has a diameter which is greater than the spacing between its associated driven wheel and the drive wheel. The pair of studs 14 are situated on the opposite sides of the first imaginary plane and on a fourth imaginary plane that extends parallel to a fifth imaginary plane including the axes of the pair of idlers 5a, 5b. It will be seen that the fourth plane is located between the second and fifth planes, and all of the second, fourth and fifth planes are parallel to each other when the support lever 12 assumes its neutral position. The free end of each idle arm extends to the opposite side of the associated idler, a spring 20 extends between the free ends of the idle arms 13a, 13b, and acts to urge the respective idlers resiliently against the drive wheel 9. As a consequence, the magnitude of torque required to rotate each idler is greater than the magnitude of torque required to rotate the support lever 12 in its free condition. The reversing mechanism operates on substantially the same principle as the previous embodiment, but because of the differential, relative positioning of the pair of idlers 5a, 5b with respect to the pair of driven wheels 1, 2, the selected driven wheel which will be driven when the support lever 12 moves in one direction will be opposite from that of the previous embodiment. Specifically, in the embodiment shown in FIG. 1, the left-hand driven wheel 1 is driven when the lever 12 is moved counterclockwise, while in the arrangement of FIG. 3, the left-hand wheel 1 will be driven when the support lever 12 is moved clockwise. In consideration of this fact, arrows indicating the direction of rotation are shown in the opposite direction. In the modified arrangement, spring 17 is provided to return the support lever 12 to its neutral position when the motor 6 is at rest. In the neutral position of the support lever 12, the respective idlers are equally spaced from their associated driven wheels.

In each embodiment described above, the wheels are preferably located such that in each operative position, the line joining the center of the driven wheel which is selected at such operative position with the center of the idler forms an angle of about 110° with the line joining the centers of the same idler and the drive wheel. In the single idler arrangement, the line joining the centers of the idler and the drive wheel preferably forms an angle of about 90° with the line joining the point of contact between the same idler and the drive wheel with the pivotal axis of the idle arm. In the latter or two idler arrangement, the angle is preferably about 110°.

When incorporating the reversing mechanism of the invention into a tape drive of a tape recorder, a reversible electric motor may be used which has a controllable number of revolutions. The tape runs at the same speed in either rapid advance or rewind mode, and it is only necessary to reverse the rotation of the motor. In a tape record or playback mode, the tape runs in the same direction as during the rapid advance mode, and it is only necessary to reduce the number of revolutions of the motor when changing from the rapid advance mode. A tape recorder having these modes may be controlled to establish a desired mode by the mere electrical control of the motor. The use of a variable speed motor can be avoided by providing an additional pulley assembly in order to drive one of driven wheels representing a take-up spool at a reduced rate, in a manner well known in the art of tape recorders.

It should be noted that the reversing mechanism can be used as a ribbon reversing mechanism in a dot matrix printer, in the same manner as the mechanism shown in U.S. Pat. No. 3,954,167.

In the above description, the arrangement comprised frictional wheels, which however may be replaced by gears or a combination of frictional wheels and gears.

What is claimed is:

1. A reversing mechanism for reversing the drive between a pair of rotatably mounted driven members comprising: a rotatable member selectively driven in either forward or reverse rotational directions during use of the reversing mechanism; a rotatable idler; support means supporting said idler in constant engagement with said rotatable member so that rotational movement of said rotatable member is transmitted to said idler and supporting said idler for selective movement into engagement with either one of the pair of driven members to transmit the rotational movement of said idler to the driven member with which it is engaged, said support means comprising a support lever mounted coaxially with said rotatable member for turning movement, and an idle arm pivotally connected to said support lever and having said idler rotatably mounted thereon; and biasing means coacting with said support means for resiliently biasing said idler into engagement with said rotatable member so that said support lever undergoes turning movement to effect movement of said idler from engagement with either one of said driven members into engagement with the other of said driven members in response to a change in the direction of rotation of said rotatable member after which the rotation of the rotatable member in the changed direction is transmitted by said idler to said other driven member to thereby drive said other driven member.

2. A reversing mechanism according to claim 1; wherein said biasing means includes a spring operative when said rotatable member is not being rotationally driven to bias said support lever to a neutral position intermediate the two positions of said support lever corresponding to when said idler engages respective ones of the two driven members.

3. A reversing mechanism according to claim 1; wherein the axis of rotation of said rotatable member lies on a first imaginary plane, the axes of rotation of said pair of rotatably mounted driven members both lie on a second imaginary plane which intersects at right angles with said first imaginary plane at a point intermediate said axes of said driven members, and the axis of rotation of said rotatable idler is situated between said second imaginary plane and a third imaginary plane which intersects said axis of said rotatable member and which is parallel to said second imaginary plane.

* * * * *